Figure 1:
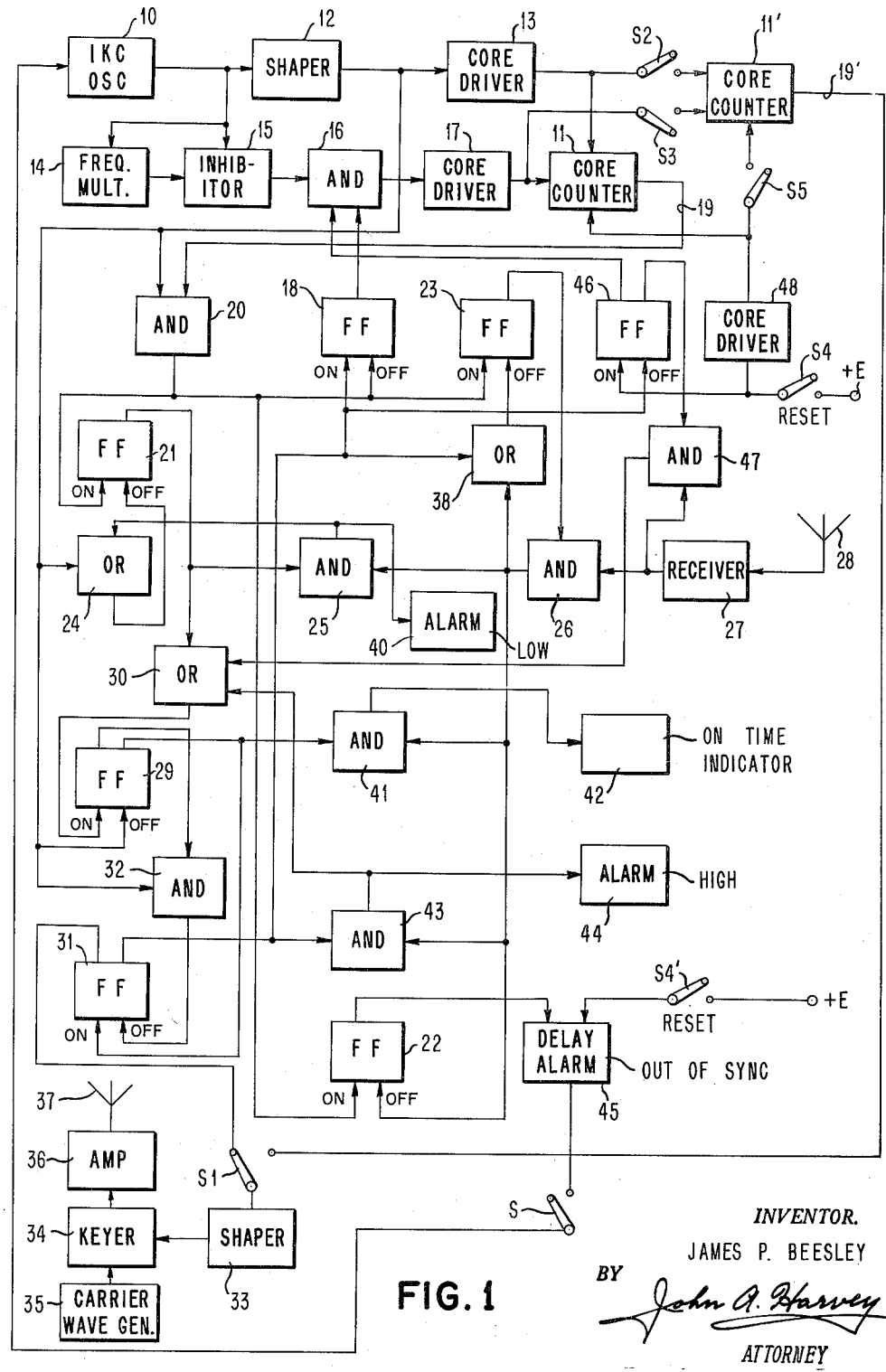

March 20, 1962

J. P. BEESLEY 3,026,481

SYNCHRONIZED TIME SYSTEM

Filed Sept. 30, 1957

2 Sheets-Sheet 1

INVENTOR.
JAMES P. BEESLEY
BY John A. Harvey
ATTORNEY

INVENTOR.
JAMES P. BEESLEY
BY John A. Harvey
ATTORNEY

United States Patent Office 3,026,481
Patented Mar. 20, 1962

3,026,481
SYNCHRONIZED TIME SYSTEM
James P. Beesley, Poughkeepsie, N.Y., assignor to International Business Machines Corporation, New York, N.Y., a corporation of New York
Filed Sept. 30, 1957, Ser. No. 687,231
11 Claims. (Cl. 328—130)

The present invention relates to timing systems and, more particularly, to timing systems which have their operation controlled by a synchronizing source to maintain accuracy of timing within predetermined tolerance limits with respect to a reference primary time provided by the source.

There are many applications where it is desirable to utilize a timing system to control the timed operation of some mechanism or system. Often the application does not permit or justify the use of very costly and elaborate timing arrangements characterized by the highest possible precision, but rather dictates less elaborate timing system constructions which may be synchronized from a highly precise primary time reference source usually remotely situated. An example of this type of application is the automatic position reporting system disclosed and claimed in copending application Serial No. 609,414, filed September 12, 1956, now Patent No. 2,972,742 in the name of Dan C. Ross, entitled "Automatic Position-Reporting System" and assigned to the same assignee as the present application. In this reporting system, a reasonably stable but relatively inexpensive secondary time reference source in the form of a stable electrical oscillator drives a stable counter to derive an output control electrical pulse potential every 16.384 second interval. Any drift or other inaccuracy of the secondary time reference source is permitted to accumulate during this interval and the resultant accuracy is then compared with the reference time standard of a remotely situated primary time reference source. Operation is permitted to continue until the inaccuracy of timing exceeds a preselected value, whereupon the operation is automatically terminated until manually restarted in exact synchronism with the primary time reference standard. This arrangement is thus in the nature of a "go" or "no go" one, and no attempt is made at corrective synchronization. The latter may often be desirable in order to effect small periodic corrections of inaccuracy and thus enable possible averaging out of the inaccuracies of timing operation over a longer time interval while nevertheless permitting the termination of the timing operation in case the inaccuracy should become excessive.

It is an object of the present invention to provide a new and improved timing system which may have its operation correctively synchronized, if inaccuracy within preselected tolerance limits occurs, from a primary time reference source but which automatically provides a suitable alarm, and if desired may be caused to cease operation, if the preselected tolerance limits of accuracy are exceeded for a preselected interval.

It is a further object of the invention to provide a novel timing system utilizing a counter having an over-all counting interval of which one portion is provided by an invariable count period of preselected value and a second portion is provided by a variable count period of value controlled by a primary time reference source.

Other objects and advantages of the invention will appear as the detailed description proceeds in the light of the drawings forming a part of this application and in which:

FIG. 1 represents the circuit arrangement of a timing system embodying the present invention; and
FIG. 2 graphically represents certain operating potentials occurring in the FIG. 1 system and is used as an aid in explaining its operation.

The timing system shown in FIG. 1 utilizes a relatively stable oscillator 10 which may, for example, have an operating frequency of one kilocycle to provide one millisecond secondary time reference intervals. These secondary intervals are counted by a core counter 11 to which the oscillations of the oscillator 10 are supplied through a shaper unit 12, which shapes or converts the sinusoidal oscillations of the oscillator 10 to relatively sharp potential pulses of short pulse duration, and a core driver amplifier unit 13. The output pulses of the shaper 12 may conveniently be considered secondary time reference pulses, and each such pulse is translated through the unit 13 to storage in the counter 11. The latter may have a construction of the type disclosed and claimed in the copending United States patent application Serial No. 683,091, filed September 10, 1957, in the name of the present applicant, entitled "Binary Counter," and assigned to the same assignee as the present application.

As explained in the latter application, the counter 11 comprises a closed ring of cores and includes three associated auxiliary control cores of which a first auxiliary core receives and temporarily stores the secondary time reference pulses supplied thereto from the core driver unit 13 and the additional two auxiliary cores operate as control cores to effect operation of the counter as a binary counting device. Each secondary time reference pulse temporarily stored in the input core of the counter 11 is shifted in the interval between successive ones of the secondary time reference pulses to storage in the lowest order storage stage of the counter or to some higher order storage stage as required for a binary count of the input pulses. This shifting operation is effected by applying to the counter 11 shift pulses which are generated by a frequency multiplier 14. The output pulses of the latter have a repetition rate related to the number of storage cores in the counter 11, and are supplied through an inhibitor 15, an AND gate 16 and a core driver amplifier 17 as shift pulses to the shift circuit of the counter 11. The function of the inhibitor in the generation of these shift pulses is to eliminate in its output circuit that shift pulse which occurs coincident in time with a secondary time reference pulse developed in the output circuit of the shaper 12. The AND gate 16 is normally conditioned by the Off state of a bistable multivibrator 18 to translate the shift pulses to the core counter 11, but terminates such translation whenever the multivibrator 18 is turned On in a manner presently to be explained.

Thus so long as the secondary time reference pulses are applied from the core driver unit 13 to the counter 11 and shift pulses are concurrently supplied by the core driver unit 17 to the counter, the counter operates to count successive secondary time reference pulses until such time as the counter completes its maximum possible count. When this occurs, a carry-out pulse is developed in the output circuit 19 of the counter and the latter is automatically reset to its initial condition at which each counting operation begins.

When the carry-out pulse of the counter 11 occurs as last described, the operation of a second counter is initiated and the operation of the counter 11 is temporarily halted until such time as the second counter completes its maximum count. As will presently be explained more fully, the second counter has an adjustable maximum count capacity controlled by primary time reference pulses. To initiate the timing operation of this second counter, the carry-out pulse of the counter 11 is applied from the output circuit 19 of the latter to an AND gate 20 to condition the latter to translate the next secondary time reference pulse generated by the shaper 12. This translated pulse is used to turn Off the multivibrator 18, thus closing the AND gate 16 to further translation of shift pulses to the counter 11, and to turn On a plurality of bistable multivibrators 21, 22 and 23.

The bistable multivibrator 21 may be subsequently turned Off either by the next secondary time reference pulse of the shaper 12 translated through an OR unit 24 or by a primary time reference pulse translated through the OR unit 24 from an AND gate 25 which is conditioned by the On state of the multivibrator 21. This primary time reference pulse is applied to the AND gate 25 through an AND gate 26, conditioned by the On state of the multivibrator 23, from a carrier wave receiver 27 which derives the time reference pulse by demodulation of a modulated carrier wave received by an antenna 28 from a remotely situated carrier wave transmitter. As explained in the aforementioned Ross application, the remotely generated time reference pulses are generated with relatively high time precision and are carried as modulation components of a carrier wave in order that plural timing systems of the type herein described may be simultaneously controlled to operate in synchronism with each other under control of primary time reference pulses. When the multivibrator 21 is turned Off in either manner last described, it turn On a bistable multivibrator 29 through an OR unit 30.

The next secondary time reference pulse developed by the shaper 12 turns Off the multivibrator 29 and causes it to turn On a bistable multivibrator 31. The latter is turned Off by the next secondary time reference pulse of the shaper 12 translated through an AND gate 32 which is normally conditioned by the Off state of the multivibrator 29 to translate this secondary time reference pulse. When the multivibrator 31 turns Off, its Off output potential is applied through a switch S1 to a shaper 33 to cause the latter to develop and apply to a keyer unit 34 a potential pulse of relatively short pulse interval. The keyer unit 34 utilizes this pulse to modulate a carrier wave generated by a carrier wave generator 35, the modulated carrier wave being suitably amplified by an amplifier 36 and being transmitted by an antenna 37 to a remote point where the modulation potential pulse is derived for utilization. The multivibrator 31 in turning Off also turns On the multivibrator 18, which thereupon conditions the AND gate 16 to translate shift pulses to the counter 11 and initiate a new period of counting operation of the latter. The multivibrator 31 in turning Off further applies through an OR unit 38 a potential pulse which turns the multivibrator 23 Off and thereby closes the AND gate 26 to the translation of a subsequently received primary time reference pulse. The importance of closing the AND gate 26 in this manner will presently be explained.

A primary timing pulse translated by the AND gate 25 not only turns Off the multivibrator 21 as earlier explained, but is additionally applied to an alarm device 40 to indicate that the frequency of the secondary timing pulses of the shaper 12 is too low with reference to the primary timing pulse. If the primary timing pulse should be translated by an AND gate 41 when the latter is conditioned by the On state of the multivibrator 29, an indicator 42 indicates satisfactory frequency of the secondary timing pulses. If the primary timing pulse should arrive while an AND gate 43 is conditioned by the On state of the multivibrator 31, it is translated both to an alarm device 44 which indicates that the frequency of the secondary timing pulses is too high and also is translated through the OR unit 30 to turn On the multivibrator 29. Each primary timing pulse if it is to be translated by the AND gate 26 must be received before this gate is closed by turn Off of the multivibrator 23 with the multivibrator 31. Accordingly each primary timing pulse translated by the AND gate 26 closes this gate by turning Off the multivibrator 23 through the OR unit 38 and further turns Off the multivibrator 22, which in its On state initiates the operation of a delay alarm device 45.

The latter operates, after a delay interval selected to indicate that the multivibrator 22 has been On for an undue period by reason of the failure to receive any primary timing pulse or because the latter arrived too early or too late to be translated while the AND gate 26 was conditioned to translate it, to provide a sensible alarm indicating that the timing system is out of synchronization with the primary timing pulses. The output of the unit 45 may if desired be applied through a switch S to terminate the operation of the oscillator 10 when this out-of-synchronization state is found to prevail.

The timing system thus far described is one wherein the shaper 33 under control of the multivibrator 31 develops and applies to the keyer unit 34 potential pulses which identify successive measured time intervals determined by operation of the timing system. The initiation of each such timing interval has a fixed relation within preselected tolerance limits to a corresponding primary timing pulse developed in the output circuit of the receiver 27. In order that the initiation of each such measured time interval may retain this fixed time relationship to a corresponding primary timing pulse but occur a selected interval later than the timing pulse, a second core counter 11' may be provided. The counter 11' has a maximum count corresponding to that provided by the counter 11. A switch S2 is closed to apply the secondary timing pulses of the shaper 12 to the counter 11' to be counted, and a switch S3 is also closed to apply to the counter 11' the shift pulses translated by the units 16 and 17. The counter 11' is preset to initiate its count on a secondary timing pulse having a preselected time difference with relation to the pulse which initiates the counting operation of the counter 11, so that the carry-out pulse which is developed in the output circuit 19' of the counter 11' likewise has this preselected time difference with relation to the carry-out pulse of the counter 11. These carry-out pulses of the counter 11' thus provide the same measured time intervals as those provided by the counter 11 but displaced in point of time from the latter. Since the counter 11 and associated multivibrators 21, 29 and 31 continue to function to maintain the oscillator 10 synchronized within preselected tolerance limits to the primary timing pulses, the timing intervals established by the counter 11' occur with the same tolerance limits. Upon transfer to the switch S1, these carry-out pulses of the counter 11' are applied through the shaper 33 to the keyer 34 for modulation and transmission of the carrier wave generated by the generator 35.

Since the timing system when initially turned On will not in general be in synchronization with the primary timing pulses, the operation of the timing system is iniated by a reset operation. To this end, a reset switch S4 is manually closed to apply a positive potential from a source +E to turn On a bistable multivibrator 46. The On state of this multivibrator also is effective to close the AND gate 16 to the translation of shift pulses as previously explained in connection with the multivibrator 18, and at the same time conditions an AND gate 47 to translate the next received primary timing pulse through the OR unit 30 to turn On the multivibrator 29. The positive potential +E which turned On the multivibrator 46 is also applied through a core driver amplifier 48 to reset all of the storage cores of the counter 11 and thereby condition the counter to begin a counting operation. This reset potential of the amplifier 48 may also upon closure of a switch S5 be applied similarly to reset the cores of the counter 11', but in this instance the cores of the counter 11' are reset to store a preselected count whereas the cores of the counter 11 are normally reset to store either a zero count if the counter 11 is to count up or to store a maximum count if the counter 11 is to count down. Having turned On the multivibrator 46 and reset the cores of the counter 11, and also those of the counter 11' of the switch S5 is closed, the switch S4 is then manually opened.

The multivibrator 46 being On, the next received primary timing pulse turns On the multivibrator 29 as earlier explained and the next pulse from the shaper 12 turns the multivibrator 29 Off and the multivibrator 31 On. The following pulse from the shaper 12 now is translated through the AND gate 32 to turn the multivibrator 31 Off, thereby producing in the output circuit of the shaper 33 a potential pulse indicating the beginning of a measured time interval provided by the timing system. The multivibrator 31 in turning Off also turns Off the multivibrator 46, thus closing the AND gate 47 to further translation of primary timing pulses and at the same time conditioning the AND gate 16 to translate shift pulses to the counter 11. A switch S4' is manually unicontrolled with the switch S4 to reset the delay alarm unit 45 in the event that the latter should be of a type providing an alarm indication in response to the act of turning On the timing system. This completes the reset operation and conditions the timing system for continued operation in synchronism with the primary timing pulses developed by the receiver 27.

Figure 2A:
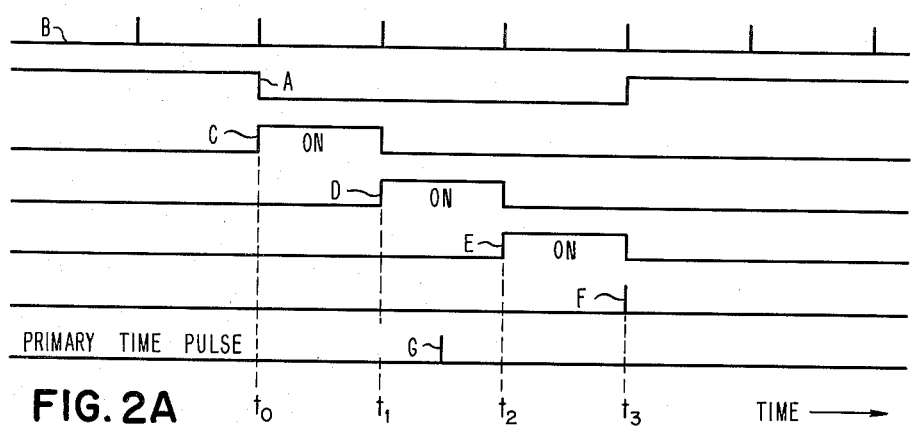
Figure 2B:
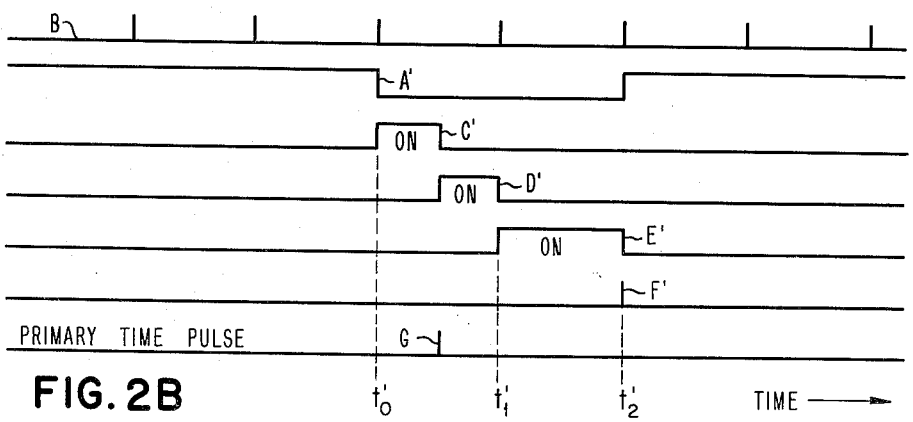

Several aspects of the over-all operation of the timing system will now be considered with particular reference to FIG. 2. Consider first the operation prevailing in the absence of primary timing pulses supplied to the timing system by the receiver 27. When the counter 11 has completed its maximum count and develops a carry-out pulse at a time $t_0$, and thereupon becomes quiescent as represented by curve A of FIG. 2A, the carry-out pulse conditions the AND gate 20 to translate the $t_0$ secondary timing pulse, represented by curve B, of the shaper 12 to turn On the multviibrator 21 as represented by curve C. As earlier explained, the AND gates 25 and 26 are now conditioned to translate a received primary timing pulse. It is assumed that the primary timing pulses are not supplied at this time by the receiver 27, so that the conditioning of the AND gates 25 and 26 has no effect. The next secondary timing pulse from the shaper 12 turns Off the multivibrator 21 and turns On the multivibrator 29 at time $t_1$ as represented by curve D of FIG. 2A. The AND gates 26 and 41 are now conditioned, but again no primary timing pulse is supplied from the receiver 27 under the assumed conditions. The next secondary timing pulse of the shaper 12 turns Off the multivibrator 29 and turns On the multivibrator 31 at time $t_2$ as represented by curve E of FIG. 2A. The AND gates 26 and 43 are now conditioned, but again no primary timing pulse is supplied by the receiver 27. The next secondary timing pulse of the shaper 12 is now translated by the AND gate 32, conditioned by the Off state of the multivibrator 29, to turn Off the multivibrator 31 at time $t_3$. This produces an output potential pulse, represented by curve F of FIG. 2A, in the output circuit of the shaper 33 to indicate the initiation of a measured timing interval of the timing system. The multivibrator 18 is concurrently turned On to open the AND gate for further translation of shift pulses to the counter 11 which thereupon resumes its count as represented by curve A. The multivibrator 23 also turns Off to close the AND gate 26 to translation of any subsequently received primary timing pulse. The multivibrator 22 was turned On in response to the carry-out pulse of the counter 11, and remains On since no primary timing pulse was received and translated by the AND gate 26 to turn it Off. Thus, after a time delay the unit 44 provides a sensible alarm indicating that the timing system is operating out of synchronism with primary timing pulses. Closure of the switch S at this time will terminate further operation of the timing system by deenergizing the oscillator 10.

The operating of the timing system in correct synchronism with primary timing pulses supplied to it by the receiver 27 is essentially similar to that just described with one essential difference. A primary timing pulse, represented by curve G, is now translated by the AND gate 26 at a time when the multivibrator 29 is On and the AND gate 41 therefore translates the primary timing pulse to the On Time indicator device 42 to provide a sensible indication of correct synchronous operation. The received primary timing pulse also turns Off the multivibrators 22 and 23 to close the AND gate 26 and deactivate the delay alarm device 45.

Consider now the operation prevailing when the frequency of the oscillator 10 is too low. Under this assumed condition, more time is required for the counter 11 to count the requisite number of secondary timing pulses from the shaper 12, and compensation must accordingly be made to reduce the period of time when the counter 11 is not in operation. This is accomplished in the following manner. The carry-out pulse of the counter 11 turns On the multivibrators 21, 22 and 23 as before and turns Off the multivibrator 18 to close the AND gate 16. Assume that this occurs at a time $t_0'$ when the counter 11 completes its count as represented by curve A' of FIG. 2B. The AND gates 25 and 26 are therefore conditioned at this time and, since unduly long period of time has been required by the counter 11 to count the requisite number of secondary timing pulses, it will be evident that the receiver 27 will develop a primary timing pulse during the On interval of the multivibrator 21. This pulse is translated through the AND gate 26 and turns Off the multivibrators 22 and 23 to close the AND gate 26 and to prevent an out-of-synchronism alarm by the unit 45. The primary timing pulse is also translated by the AND gate 25 (conditioned by the On state of the multivibrator 21) to the alarm unit 40 to provide a sensible alarm indicating the unduly low frequency of the oscillator 10 and is additionally translated through the OR unit 24 to turn Off the multivibrator 21 as represented by curve C' of FIG. 2B. This causes the multivibrator 29 to turn On through the OR unit 30, and it is then turned Off at time $t_1'$ by the next secondary timing pulse of the shaper 12 as represented by curve D' of FIG. 2B. It should be noted at this point that whereas for the operating conditions initially assumed and represented by curves C, D and G of FIG. 2A the multivibrators 21 and 29 are On for a total of two secondary timing intervals, under the presently assumed condition that the frequency of the oscillator 10 is too low the multivibrators 21 and 29 are turned On for a total time equal only to one secondary time interval as shown by curves C' and D'. The next secondary timing pulse of the shaper 12 is now translated by the AND gate 32 at time $t_2'$ to turn Off the multivibrator 31, as represented by curve E' of FIG. 2B. This causes the shaper 33 to generate a measured timing interval pulse, represented by curve F', and turns On the multivibrator 18 to open the AND gate 16 for translation of shift pulses to the counter 11. It will be noted that under this assumed condition the frequency of the oscillator 10 is low, the counter 11 has been inactive only during two secondary timing intervals as represented by curve A' of FIG. 2B rather than the normal three secondary timing intervals prevailing during synchronized operation of the timing system and as represented by curve A of FIG. 2A. Thus the maximum count of the counter 11 and of the counter portion comprised by the multivibrators 21, 29 and 31, has been reduced by one counting unit, thereby to maintain its counting period equal to the period between the primary timing pulses.

Consider now the operation prevailing for the assumed condition that the frequency of oscillator 10 is unduly high. Under this condition, the time required for the counter 11 to effect its maximum count is less than it should be for synchronous system operation and compensation must be introduced to increase the over-all counting interval to make it correspond with the interval between primary timing pulses. The manner in which this is accomplished will now be considered. The carry out of the counter 11 is now premature and, as represented by curve A″ of FIG. 2C, occurs at a time $t_0″$ more than two secondary time intervals prior to the occurrence of the primary timing pulse represented by curve G. The multivibrators 21, 22 and 23 are turned On and the multivibrator 18 is turned Off as before. Since the multivibrator 21 was turned On prematurely, no primary timing pulse is received before the next secondary timing pulse at time $t_1″$ so that the latter turns Off the multivibrator 21 and turns On the multivibrator 29 as represented by the respective curves C″ and D″ of FIG. 2C. The multivibrator 29 is also turned On prematurely under the assumed conditions, so that no primary timing pulse is received before the next secondary timing pulse at time $t_2″$ turns Off the multivibrator 29 and turns On the multivibrator 31 as represented by curve E″ of FIG. 2C. The AND gates 26 and 43 are conditioned to translate the primary timing pulse received at time $t_3″$. This pulse turns Off the multivibrators 22 and 23 to close the AND gate 26 and to prevent an out-of-sync alarm, and is translated by the AND gate 43 to energize the alarm device 44 and provide a sensible indication that the frequency of the oscillator 10 is high.

Figure 2C:
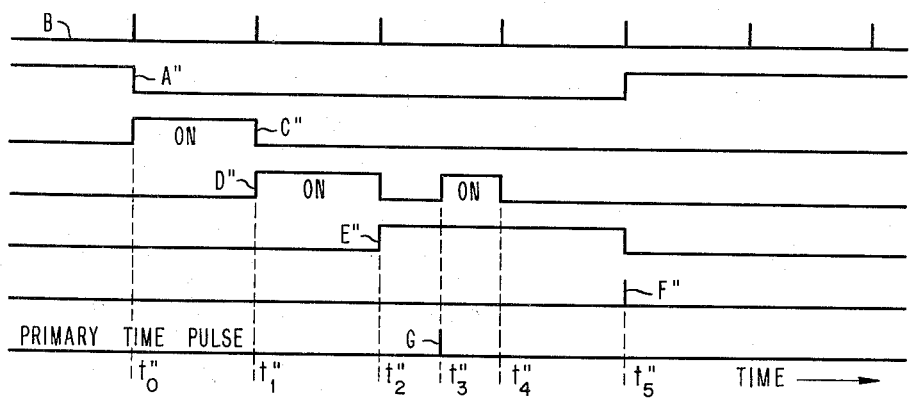

At the same time, the primary timing pulse translated by the AND gate 43 is translated through the OR unit 30 to turn the multivibrator 29 On again as shown by curve D″ of FIG. 2C. The On state of the multivibrator 29 closes the AND gate 32, so that the next secondary timing pulse at time $t_4″$ is not translated by the AND gate 32 to turn Off the multivibrator 31 but does effect turn Off of the multivibrator 29. Note now that the total time that the multivibrators 21 and 29 have been On is equal to three secondary timing intervals, as represented by curves C″ and D″ of FIG. 2C, rather than the one secondary timing interval indicated graphically in FIG. 2B or the two secondary timing intervals represented graphically in FIG. 2A. Now when the next secondary timing pulse at time $t_5″$ is translated by the gate 32 (now conditioned by the Off state of the multivibrator 29) to turn Off the multivibrator 31 and develop an interval pulse F″, it will be seen from curve A″ of FIG. 2C that the counter 11 has remained inactive for a total of four secondary timing intervals. Accordingly, the maximum count provided by the counter 11 and the counter portion comprised by the multivibrators 21, 29 and 31 has been increased by one unit so that the total counting interval is again made equal to the interval between successive primary timing pulses.

It will be apparent from the foregoing description of the invention that primary timing pulses, by controlling the variable count of the counter portion comprised by the multivibrators 21, 29 and 31, maintain the measured time interval provided by the timing system within preselected tolerance limits (established by the interval between the secondary timing pulses of the shaper 12). This synchronized operation of the timing system prevails so long as a primary timing pulse is applied to the timing system within the combined counting interval of the counter portion comprised by the multivibrators 21, 29 and 31, and an out-of-synchronism alarm is only developed when the operation of the timing system is not within these limits of synchronization with the primary timing pulses.

While a specific form of the invention has been described for purposes of illustration, it is contemplated that numerous changes may be made without departing from the spirit of the invention.

What is claimed is:

1. A timing system comprising, a secondary time reference source, timing means providing successive measured time intervals and having a cyclic operating period initiated and controlled by said source during a major portion of said interval, and means responsive to a primary reference time for controlling said timing means during a variable control terminal portion of each said interval to establish the time of initiation of the succeeding operating period of said timing means by said source and thereby maintain said measured time intervals constant within preselected tolerance limits.

2. A timing system comprising, timing means having an operating cycle including active and inactive operational portions for providing by reference to corresponding preselected points in two successive cycles thereof a measured time interval, a secondary time reference source for controlling the duration of the active operational portion of each cycle of said timing means, and means controlled by said source and responsive to a primary reference time for controlling the duration of the inactive operational portion of each cycle of said timing means to maintain the duration of each operating cycle thereof constant within preselected tolerance limits.

3. A timing system comprising, time reference means providing a source of secondary time reference intervals, means for counting said intervals to provide a measured time interval, and means responsive to completion of a preselected count by said counting means and to a primary reference time for controlling the initiation of the succeeding counting operation of said counting means to maintain said measured interval constant within preselected tolerance limits.

4. A timing system comprising, time reference means providing a source of secondary time reference intervals, means for counting said intervals to provide a measured time interval, and means having an operation initiated upon completion of a preselected count by said counting means and having an operational interval jointly controlled by said secondary time reference source and a primary reference time for initiating each counting operation of said counting means to maintain said measured time interval constant within preselected tolerance limits.

5. A timing system comprising, time reference means providing a source of secondary time reference intervals, first counting means for counting said intervals to provide a measured time interval, second counting means responsive to completion of a preselected count by said first counting means for performing a count of said secondary reference intervals to a number thereof controlled by a primary reference time, and means responsive to completion of each count by said second counting means for initiating a further counting operation of said first counting means.

6. A timing system comprising, a source of timing pulses to be counted, means including a first counter portion for counting a preselected number of said pulses and a second counter portion for counting a variable number of said pulses and including means for alternating the utilization of said pulses by said counter portions upon completion of the maximum count by each thereof, and means responsive to control pulses occurring in asynchronous relation to said first pulses for controlling the maximum number of said first pulses to be counted during each operation of said second counter portion to control by said control pulses the maximum totalized pulse count effected by said counter portions.

7. A timing system comprising, a source of electrical pulses to be counted, means including a first counter portion for counting a preselected number of said pulses and a second counter portion for counting a variable number of said pulses and including means for alternating the utilization of said pulses by said counter portions upon completion of the maximum count by each thereof, and means responsive to timing electrical pulses occurring in asynchronous relation to said first pulses for controlling the maximum number of said pulses to be counted during each operation of said second counter portion to control by said timing pulses the maximum totalized pulse count effected by said counter portions.

8. A timing system comprising, a secondary time reference source, timing means having a cyclic operating period controlled by said source for providing a measured time interval proportional to said cyclic period, and means responsive to a primary reference time for controlling the operating period of said timing means in addition to said control thereof by said source to modify each said cyclic period of said timing means in a direction and to an extent as necessary to maintain each of a continuing succession of said measured time intervals constant within preselected tolerance limits.

9. A timing system comprising, a secondary time reference source, timing means having a cyclic operating period initiated and thereafter controlled by said source for providing a measured time interval, and means responsive to a primary reference time for adjustably selecting the length of a terminal portion of each said operating period for control of the initiation of the succeeding operating period of said timing means by said source to maintain each of a continuing succession of said measured intervals constant within preselected tolerance limits.

10. A timing system comprising, a secondary time reference source, timing means having a cyclic operation initiated by and progressing under control of said source for providing by reference to corresponding preselected points in two successive cycles thereof a succession of substantially uniform measured time intervals, and means responsive jointly to the secondary time reference of said source and to a primary reference time for adjustably controlling the duration of each cycle of operation of said timing means to maintain said measured time interval constant within preselected tolerance limits.

11. A timing system comprising, time reference means providing a source of secondary time reference intervals, timing means for counting said intervals to provide a measured time interval, and means responsive to a primary reference time for terminating each counting period of said timing means and initiating a succeeding counting period thereof to control the maximum count effected by said timing means within each said measured time interval to maintain said measured interval constant within preselected tolerance limits.

References Cited in the file of this patent
UNITED STATES PATENTS

| | | |
|---|---|---|
| 2,740,091 | Goulding | Mar. 27, 1956 |
| 2,766,450 | Frank | Oct. 9, 1956 |
| 2,811,716 | Crist | Oct. 29, 1957 |
| 2,819,457 | Hamilton | Jan. 7, 1958 |
| 2,829,342 | Pfleger | Apr. 1, 1958 |